United States Patent [19]

Nunlist et al.

[11] 4,173,246

[45] Nov. 6, 1979

[54] FEED DISTRIBUTOR FOR GLASSED STEEL WIPED FILM EVAPORATOR

[75] Inventors: Erwin J. Nunlist, Penfield, N.Y.; James Mitchell, Leven, Scotland

[73] Assignee: Sybron Corporation, Rochester, N.Y.

[21] Appl. No.: 808,118

[22] Filed: Jun. 20, 1977

[51] Int. Cl.$^2$ .............................................. B01D 1/22
[52] U.S. Cl. .................... 159/6 W; 159/13 C; 159/DIG. 15
[58] Field of Search .............. 159/6 W, 6 R, DIG. 15, 159/13

[56] References Cited

U.S. PATENT DOCUMENTS

| | | | |
|---|---|---|---|
| 2,955,990 | 10/1960 | Smith | 159/6 W |
| 2,974,725 | 3/1961 | Samesreuther et al. | 159/6 W |
| 3,266,555 | 8/1966 | Thier | 159/6 W |
| 3,382,158 | 5/1968 | Smith | 159/DIG. 15 |
| 3,770,592 | 10/1973 | Noirot | 159/DIG. 15 |
| 4,017,354 | 4/1977 | Marchenko et al. | 159/6 R |

*Primary Examiner*—Norman Yudkoff
*Attorney, Agent, or Firm*—Theodore B. Roessel; James A. Rich

[57] ABSTRACT

A glassed steel wiped film evaporator is provided with an improved feed distributor comprising a one piece circular non-metallic distribution chamber, attached to and rotating with the evaporator wiper assembly, and corrosion resistant feed conduits extending outwardly from said distribution chamber and terminating near the wall of the vessel. This distributor provides the efficiencies of distribution of previous flat plate alloy distributors; and at the same time it is of a sound construction that can be built at reasonable cost from commercially available fluorocarbon and other corrosion resistant materials.

14 Claims, 5 Drawing Figures

FEED DISTRIBUTOR FOR GLASSED STEEL WIPED FILM EVAPORATOR

BACKGROUND OF THE INVENTION

This invention relates to an improved feed distributor for glassed steel wiped film evaporators.

Wiped film evaporators are used to increase evaporation or separation rates in a variety of concentrating, separating, refining, decolorizing and deodorizing processes. Typical applications include evaporation of organic compounds, concentration of solids in solution, removal of color bodies from materials of medium and high molecular weights, purification of drugs and food concentration. In these evaporators, the materials to be treated typically flows down the inside of a cylindrical vessel wall, while rotating wiper blades spread the material across the wall and maintain a uniform film of the material on the wall. Typical examples of this type of evaporator are disclosed in U.S. Pat. Nos. 2,955,990 - Smith, 3,060,107 - Smith, 3,395,419 - Nunlist et al and 3,396,085 - Nunlist Most present wiped film evaporators use alloys such as 300 Series stainless steel for vessel walls, agitator support assemblies, feed distributors and other components that are in contact with the material being treated and/or one or more products of the process. However, in some process which involve higher temperatures and/or more corrosive products, such as some herbicides, or products with especially high purity requirements, it is desirable to have higher corrosion resistance and/or materials of construction that are easier to clean and less likely to contaminate the product. In this type of application, glass or enamel lined steel and/or various non-metallic materials such as fluorocarbons are generally more desirable materials of construction than alloys. One example of an evaporator using these materials is provided by United Kingdom Pat. Application 51576/76, filed Dec. 10, 1976 in the name of James Mitchell et al; and in corresponding U.S. Pat. application No. 817,003, filed July 18, 1977.

In many alloy wiped film evaporator, such as the one shown in Smith Pat. No. 2,955,990 and both of the above identified Nunlist patents, the incoming material to be treated flows onto a substantially flat distributor plate that rotates with the wiper assembly. From there, the material flows through short distributor pipes or nozzles (Smith) or V-shaped notches (Nunlist) onto the vessel wall, preferably just ahead of wiper blades immediately below the plate. This type of feed distributor plate serves to degas the incoming raw material and supply it evenly to the vessel wall. Also, it can be fabricated relatively easily and reasonably economically from commercially available alloy materials. Unfortunately, this type of distributor plate cannot be fabricated with present technology from glassed steel and/or fluorocarbon type plastics.

If the foregoing type of distributor were constructed of glassed steel, the high temperatures of the enamelling process would be likely to distort the critical surfaces of the plate. Subsequent machining or grinding could not adequately correct its trueness. Additionally, exposed metal would be unavoidable if any tapped holes were required. For most sizes of wiped film evaporators, distributor plates of this type cannot be formed of corrosion resistant non-metallic materials because pieces of this size are not available. A large flat plate constructed of smaller pieces of non-metallic materials is impractical because of the lack of reliable methods of joining them together.

As a result of the problems posed by glassed steel and/or non-metallic construction, previous glassed steel wiped film evaporators have used different types of feed distributors. The evaporator shown in the above-identified Mitchell et al application, for example, uses two small polytetrafluoroethylene plates fixed to the vessel wall. This type of distributor does not spread the feed evenly around the vessel. With high viscosity materials, in particular, this can result in the failure to wet part of the shell, which reduces the effective evaporation area, and may cause some of the material to be burned onto the vessel wall or otherwise degraded.

SUMMARY OF THE INVENTION

An object of this invention is to provide a corrosion resistant feed distributor system that maintains the distribution efficiencies of the foregoing circular plate alloy distributors; and at the same time, is of sound construction that can be built at reasonable cost.

The distributor provided by this invention has a one piece circular non-metallic distribution chamber, supported by and rotating with the wiper assembly. Feed conduits extend outwardly from the distribution chamber and terminate near the vessel wall, preferably immediately ahead of wiper blades just below the ends of the conduits. Since the distribution chamber is relatively small, it can be machined from commercially available corrosion resistant non-metallic materials, such as fluorocarbons. The feed conduits may also be produced readily from commercially available fluorocarbon materials, or of various other corrosion resistant materials such as glassed steel. Thus, this invention provides a distributor which has no exposed metallic surfaces, retains the distributional efficiencies of the above-identified flat plate designs, and can be built at a reasonable cost.

Other objects and advantages of this invention will be apparent from the following description.

DRAWINGS

DETAILED DESCRIPTION

Figure 1:
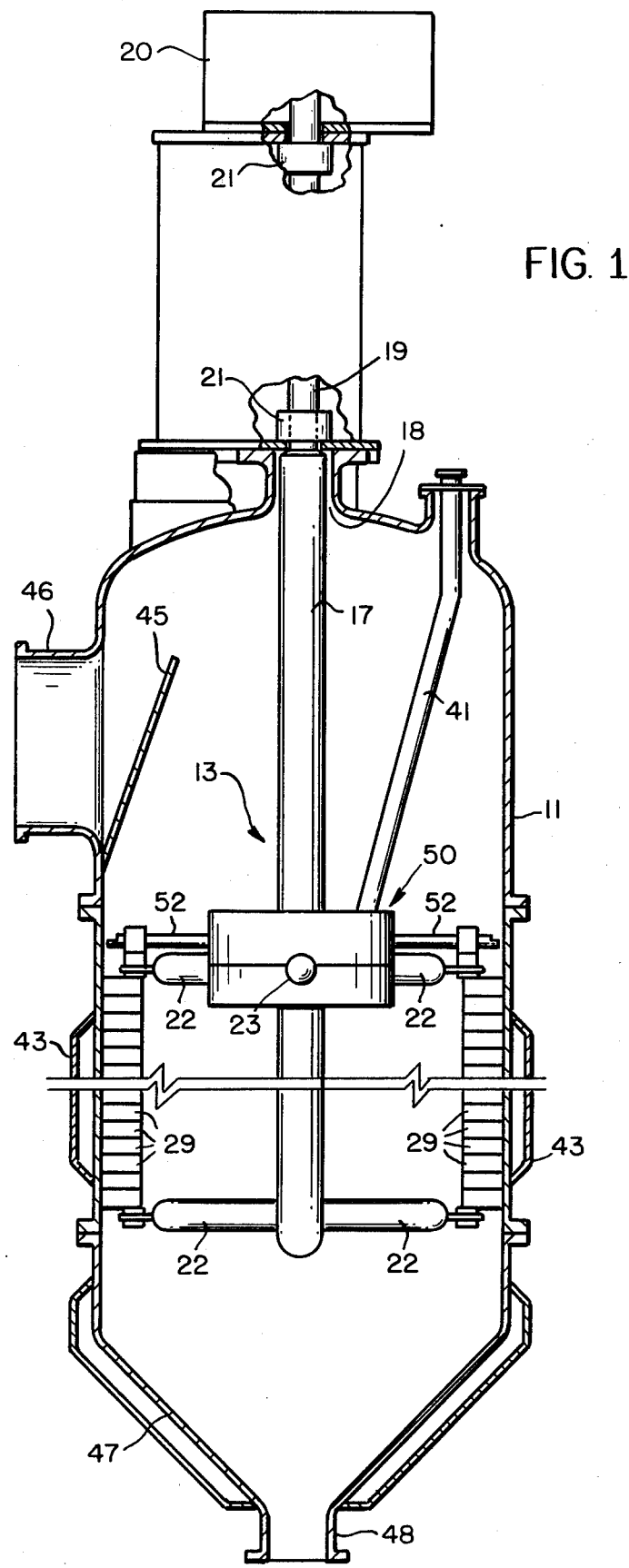
FIG. 1 is a cross-sectional elevation view of a glassed steel evaporator embodying the distributor of this invention.

FIG. 1 shows a glassed steel wiped film evaporator embodying this invention which is suitable for handling various corrosive liquids. With the exception of the feed distributor of this invention it is generally similar to the evaporator disclosed in the above-identified Mitchell et al application which discusses various features of this evaporator in greater detail.

The evaporator comprises a cylindrical steel vessel 11 having a vertical axis and housing a rotating wiper assembly, generally referred to as 13. The interior walls of vessel 11 and many of its internal components are lined with glass or enamel so that there are no metallic surfaces exposed to fluids within the evaporator. As used herein, it should be understood that the term "enamel" means a porcelain enamel, i.e., a vitreous or partially devitrified inorganic coating bonded to a metallic substrate at a temperature above approximately 425° C.

The rotating wiper assembly 13 includes a shaft 17 which extends through an opening 18 in the top of the vessel 11. A coupling 19 connects shaft 17 to a motor 20 supported above the vessel. Bearings 21 above the vessel support coupling 19 and shaft 17.

Arms 22, extending radially from shaft 17, carry the wiper blades 29 that spread the fluid being treated across the interior surface of vessel 11. As is discussed in the above-identified Mitchell et al application, the shaft 17 may be provided with a series of axially and circumferentially spaced radial arms 22, so that wiper blades at one level in the vessel may be staggered circumferentially from the wiper blades in an adjacent level. The staggered radial arms 22 and wiper blades have been omitted from FIG. 1 for purposes of clarity.

Figure 2:
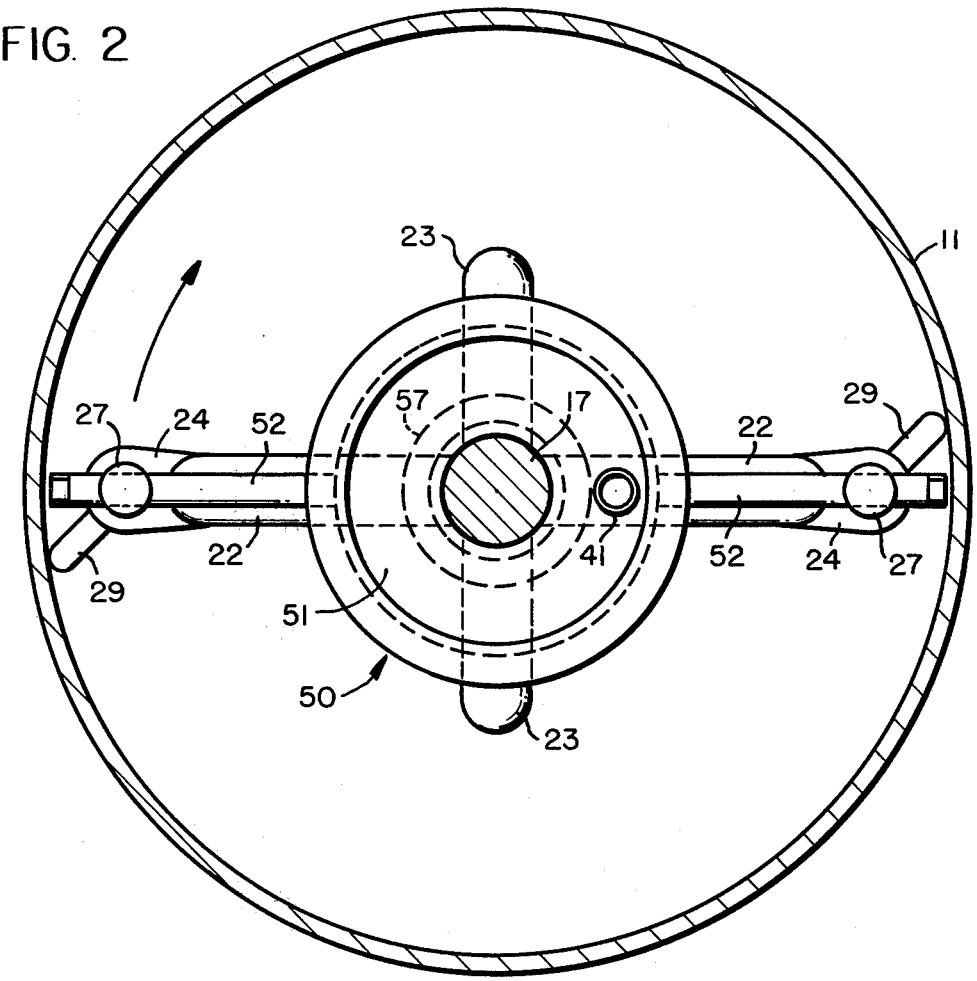
FIG. 2 is a cross-sectional plan view, taken along lines 2—2 of FIG. 1.
Figure 3:
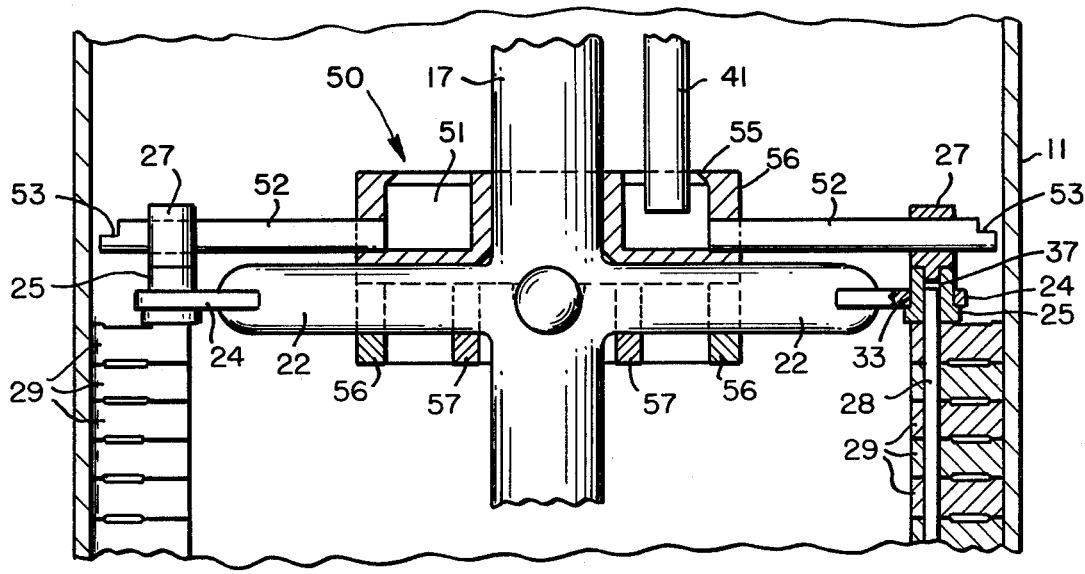
FIG. 3 is a cross-sectional elevation view taken from the same vantage point as FIG. 1 showing the feed distributor in greater detail.

As best seen in FIGS. 2 and 3, a radially extending plate 24 is welded to the end of each radial arm 22. Plates 24, arms 22 and shaft 17 are covered with an unbroken enamel coating which provides the desired corrosion resistance.

Socket members 25 are inserted in bores 33 through the plates 24 at the end of each radial arm 22. The socket members 25, which are preferably of glass filled polytetrafluoroethylene, support glassed steel wiper rods 28 which in turn support the wiper elements 29. Rods 28 are inserted through open bores 37 through the top socket members 25 and are supported in blind or closed bores in the lower socket members. The open bore 37 through socket member 25 is closed by a plug 27 which may be pressed into bore 37 or alternatively can be fused to member 25. As may be seen in FIG. 3, the uppermost plugs 27 of the wiper assembly also serve as supports for part of the novel feed distribution system of this invention.

The liquid to be treated enters vessel 11 through a glassed steel inlet pipe 41, which deposits the liquid in the novel feed distribution system of this invention, generally referred to as 50. This system distributes the liquid on the vessel wall just above and in front of the uppermost wiper blades. From there, the liquid flows down the vessel wall while the rotating wiper blades 29 maintain a thin uniform film of the liquid on the wall. The liquid flowing down the wall in the section contacted by the wiper elements 29 is typically heated by steam in a jacket 43 surrounding the vessel to increase the evaporation rate. The vapor driven off the liquid flows up through the central portion of vessel 11, past a demister plate 45 and through an outlet 46 which leads to a condensor (not shown).

The residue or unvaporized constituents of the feed material flow down through a conical collection section 47 and are discharged through a bottom outlet 48.

As may be seen in FIGS. 2 and 3, the novel feed distributor 50 of this invention includes a relatively small one piece feed distribution chamber 51 which surrounds the axial shaft 17 of the rotating wiper assembly and is supported by the radial arms 22 that support the wiper blades. The distribution chamber 51 is also supported by two additional support arms 23, best shown in FIG. 2, which are at the same level as and displaced 90° from the uppermost wiper support arms 22. The auxillary support arms 23 are also covered with the integral enamel coating that protects the shaft 17 and wiper blade support arms 22. Since the distribution chamber 51 is relatively small, the auxilliary support arms 23 normally do not need to be as long as the wiper blade support arms 22.

The feed distribution chamber 51 is secured to the wiper support arms 22 and auxiliary support arms 23 by two polytetrafluoroethylene support rings 56, 57 beneath the arms. As may be seen in FIG. 4, the rings 56, 57 are attached to the distribution chamber by polytetrafluoroethylene screws 58.

The feed inlet pipe 41 deposits the incoming fluid in feed distribution chamber 51. Typically the incoming fluid is supplied at a controlled rate that forms a relatively thin film of liquid on the bottom of the distribution chamber. This allows gases in the fluid to be drawn off by the vacuum within the vessel.

As the wiper assembly 13 rotates, centrifugal force carries the fluid from distribution chamber 51 out through two radially extending feed conduits 52, screwed into openings in the feed distribution chamber 51. These conduits distribute the material evenly about the shell of the vessel.

The outer ends of the feed conduits 52 are supported by the plugs 27 in the upper socket members 25. As may be seen in FIG. 3, the wiper blades 29 trail blade support arms 22. Thus, with this mode of support, the feed conduits 52 deposit the liquid just ahead of the uppermost wiper blades.

As shown in FIG. 3, the feed distribution chamber is preferably in the form of an annular ring. This eliminates the need for any seals between the distribution chamber and the shaft 17. The feed distribution chamber may typically be about 500 to 600 mm in diameter. Chambers of this size can be machined from commercially available integral pieces of various fluorocarbons, such as polytetrafluoroethylene.

Since the distribution chamber 51 is relatively small and shallow, an inwardly inclined lip 55 is provided at the top of the outer wall 56 of the chamber to prevent splashing.

The feed conduits 52 may be polytetrafluoroethylene pipes. They may also be made of glassed steel or various other corrosion resistant materials that are either commercially available or readily produced in the form of pipes or tubes. Typically, the inside diameter of these conduits may be about 50 mm. This allows solid lumps or particles, which may be present in some feed stocks under certain conditions, e.g., during start-up, to pass easily through the conduit. As may be seen in FIG. 3, the top of the outer ends of the conduits can be cut away to let the particles pass freely from the conduit to the vessel wall.

Figure 4:
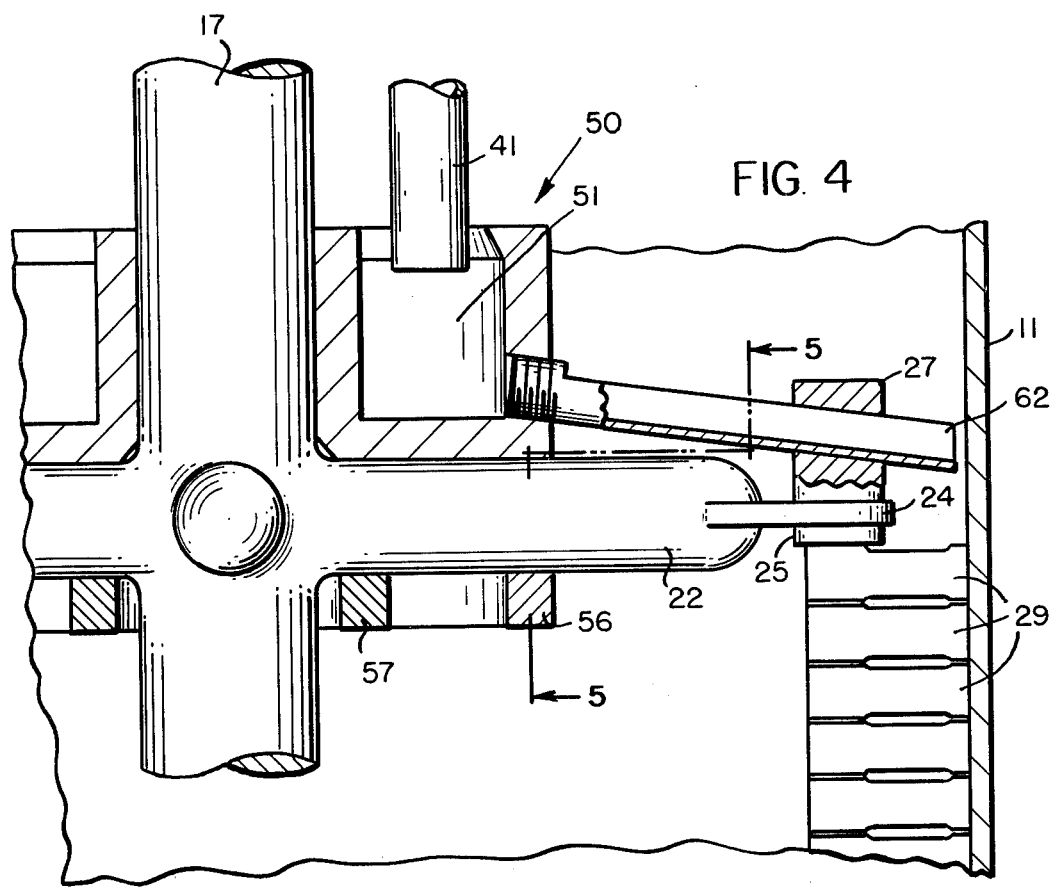
FIG. 4 is a enlarged sectional elevation view of a modified embodiment of this invention.
Figure 5:
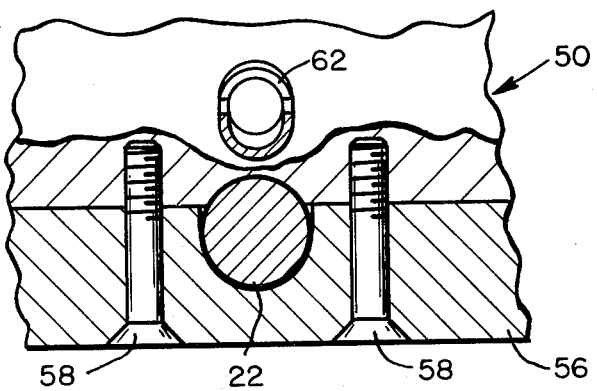
FIG. 5 is a framentary cross-sectional view along line 5—5 of FIG. 4.

FIGS. 4 and 5 illustrate slightly modified versions of this invention. In this embodiment, as is perhaps best seen in FIG. 4, the feed conduits 62 are in the form of open topped troughs. This facilitates cleaning of the conduits 62. Conduits of this sort may be easily produced by cutting a segment from commercially available polytetrafluoroethylene pipe or tubing.

The feedconduits 62 shown in FIGS. 4 and 5 are also inclined slightly below the horizontal so that centrifugal force imparted to the fluid by the rotation of the wiper assembly is assisted by gravity. This may be desirable with particularly viscous liquids, in evaporators designed to operate at relatively low rotational speeds, or in larger evaporators.

As may be readily appreciated from the foregoing description, both of the embodiments described above retain the distributional advantages of previous flat plate alloy distributors and, at the same time they can be produced easily and relatively inexpensively from commercially available materials that afford high corrosion resistance and product purity. Those skilled in the art will be able to make numerous other versions which possess these advantages within the scope of the present invention, which is defined by the following claims.

We claim:

1. In a glass lined wiped film evaporator having a rotating wiper assembly including a central axial shaft, glass coated steel arms extending outwardly from said axial shaft, and wiper blades supported at the ends of said arms, a corrosion resistant feed distributor comprising:

a one piece annular fluorocarbon distribution chamber surrounding said axial shaft, overlying said cross arms and rotating with said wiper assembly, said chamber being free to expand radially along said arms;

support means mounted at the ends of said glass coated steel arms;

corrosion resistant distributing nozzles extending outwardly from said distribution chamber through said support means and terminating near an interior wall of said evaporator, said nozzles being free to slid in said support means to account for differences in thermal expansion between said nozzles and/or said distribution chamber with respect to said arms; and means for supplying liquid to be treated in said evaporator to said annular distribution chamber, whereby said liquid flows from said distribution chamber out through said distributing nozzles and is deposited on the wall of the evaporator as the wiper assembly rotates.

2. An evaporator according to claim 1 wherein said distribution chamber is machined from an integral piece of fluorocarbon.

3. An evaporator according to claim 1 wherein said fluorocarbon is polytetrafluoroethylene.

4. Apparatus according to claim 1 or 3 wherein the outer ends of said distributing nozzles terminate slightly ahead of the wiper blades in the direction of rotation of said wiper assembly, whereby said liquid is supplied to the outer wall of the evaporator just ahead of the wiper blade closest to the distributing nozzles.

5. An evaporator according to claim 1 wherein said distribution chamber is about 500 to 600 mm in diameter.

6. An evaporator according to claim 1 further comprising an inwardly inclined lip at the top of an outer wall of said distribution chamber.

7. An evaporator according to claim 1 wherein said distributing nozzle comprise tubes.

8. An evaporator according to claim 7 wherein the inside diameter of said tubes is about 50 mm.

9. An evaporator according to claim 7 wherein the top of the outer ends of the distributing nozzles are cut away.

10. An evaporator according to claim 1 wherein said distributing nozzles comprise open topped troughs.

11. An evaporator according to claim 1 wherein said distributing nozzles comprise a fluorocarbon.

12. An evaporator according to claim 11 wherein said fluorocarbon is polytetrafluoroethylene.

13. An evaporator according to claim 1 wherein said distributing nozzles comprise glassed steel.

14. An evaporator according to claim 1 or 3 wherein vertically extending rods are supported at the ends of said glass coated steel arms, said wiper blades are mounted on said rods, and said support means comprise plugs mounted above said rods.

* * * * *